United States Patent [19]

Nisper

[11] 4,194,747
[45] Mar. 25, 1980

[54] THREE-PIECE OIL CONTROL RING

[75] Inventor: Kenneth J. Nisper, Muskegon, Mich.

[73] Assignee: Muskegon Piston Ring Company, Muskegon, Mich.

[21] Appl. No.: 966,647

[22] Filed: Dec. 5, 1978

[51] Int. Cl.² ............................................. F16J 9/20
[52] U.S. Cl. ................................... 277/140; 267/1.5
[58] Field of Search ............................. 277/139–141, 277/200; 267/1.5

[56] References Cited

U.S. PATENT DOCUMENTS

| | | | |
|---|---|---|---|
| 2,273,691 | 2/1942 | Bowers | 309/45 |
| 2,591,190 | 4/1952 | Olson | 309/45 |
| 2,635,022 | 4/1953 | Shirk | 277/140 |
| 2,770,512 | 11/1956 | Hamm | 277/140 |
| 2,785,030 | 3/1957 | Olson | 277/140 |
| 2,859,079 | 11/1958 | Olson | 309/45 |
| 2,893,801 | 7/1959 | Heid | 277/140 |
| 3,081,100 | 3/1963 | Nisper | 277/140 |
| 3,124,364 | 3/1964 | Burns et al. | 277/76 |
| 3,191,947 | 6/1965 | Hamm | 277/139 |
| 3,191,948 | 6/1965 | Hamm | 277/139 |
| 3,371,938 | 3/1968 | Hamm et al. | 277/200 |
| 3,442,519 | 5/1969 | Hamm et al. | 277/140 |
| 3,628,800 | 12/1971 | Prasse | 277/140 |
| 3,741,569 | 6/1973 | Mayhew | 277/140 |
| 4,053,164 | 10/1977 | Saylor | 277/139 |

FOREIGN PATENT DOCUMENTS 726986  3/1955  United Kingdom .................... 277/140

Primary Examiner—Robert S. Ward, Jr.
Attorney, Agent, or Firm—Price, Heneveld, Huizenga & Cooper

[57] ABSTRACT

A three-piece oil control ring including top and bottom rail rings and a circumferential spacer-expander is disclosed. The spacer-expander includes a plurality of spring elements interconnected by integral webs. Each of the spring elements is generally U-shaped in axial section and includes a top leg, a bottom leg and a base interconnecting the legs. The top leg defines a radial slot extending from the inner radial edge thereof along the entire radial length of the top leg. The bottom leg is slotless and the centroid of each spring element is located axially above the circumferential center line of the spacer-expander. A greater tension is exerted by the spring elements on the top rail ring than on the bottom rail ring.

20 Claims, 3 Drawing Figures

THREE-PIECE OIL CONTROL RING

BACKGROUND OF THE INVENTION

The present invention relates to oil control piston rings and more particularly to three-piece oil control rings of the type including top and bottom split rail rings and a circumferential spacer-expander.

In internal combustion engines, the piston skirt, the cylinder walls and the compression rings are lubricated, cleaned and cooled by lubricant which is splashed or otherwise directed onto the cylinder walls. Oil control rings are necessary to limit the amount of oil which passes into the combustion chamber to thereby reduce emissions, increase engine efficiency and to provide acceptable oil economy. In typical engine designs, lubricant in excess of the amount necessary for lubricating purposes is directed against the cylinder walls. This excess lubricant circulates so as to clean the cylinder walls and also transfers heat to the crankcase or oil sump. The lubricant also increases the effectiveness of the seal between the rings and the cylinder walls and between the rings and the piston.

A wide variety of different oil control rings have been proposed. The prior proposals have included one-piece, two-piece and three-piece oil control rings. The one-piece rings are slotted to provide a return passage for the excess lubricant scraped from the cylinder wall. Two-piece oil control rings include a split rail ring biased against the cylinder wall by a spacer-expander. The spacer-expander has spring elements and integral segmented ring elements. Three-piece oil control rings include top and bottom split rail rings and a spacer-expander.

Examples of the various types of oil control rings which have heretofore been proposed may be found in U.S. Pat. No. 2,635,022, entitled PISTON RING ASSEMBLY, and issued on Apr. 14, 1953, to Shirk; U.S. Pat. No. 2,859,079, entitled TRIPLE SEAL PISTON RING, and issued on Nov. 4, 1958, to Olson; U.S. Pat. No. 3,124,364, entitled PISTON RING ASSEMBLY, and issued on Mar. 10, 1964, to Burns et al; U.S. Pat. No. 3,191,947, entitled PISTON RING, and issued on June 29, 1965, to Hamm; U.S. Pat. No. 3,191,948, entitled PISTON RING, and issued on June 29, 1965, to Hamm; U.S. Pat. No. 3,371,938, entitled PISTON RING, and issued on Mar. 5, 1968, to Hamm et al; U.S. Pat. No. 3,442,519, entitled MONORAIL PISTON RING, and issued on May 6, 1969, to Hamm et al; U.S. Pat. No. 4,053,164, entitled SPACER-EXPANDER FOR A PISTON OIL CONTROL RING, and issued on Oct. 11, 1977, to Saylor; and U.S. Pat. No. 3,741,569, entitled OIL CONTROL PISTON RING, and issued on June 26, 1973, to Mayhew.

The majority of the prior oil control piston rings as exemplified by these aforementioned patents, have attempted to obtain equal contact forces between the cylinder wall and the top and bottom split rails or the top rail and the bottom segmented rail. For example, the aforementioned Mayhew patent discloses a two-piece piston ring for oil control purposes including a plurality of axially, centrally located U-shaped cross-section legs connecting axially top and bottom portions of the ring. The U-shaped cross-section legs which define the spring elements are alternately connected to adjacent legs by circumferential bars at either the top or bottom of the "U". The radial thickness of the bars is controlled so that the spring rates between the top and bottom rail rings are equalized.

The need for equalizing of the forces exerted on the rails and hence on the cylinder wall has generally been accepted commercially even though it has been known that the lower rail of the oil control ring has negligible effect on engine oil economy. It has been demonstrated that the top rail of the oil control ring, which is closer to the high pressure area of the combustion chamber, performs substantially all of the oil control function. Elimination of the lower ring or unequal distribution of the spring forces has not generally been considered desirable since the lower rail structure is needed to effect a counter rotating coupling to the upper rail. The counter rotating coupling insures that the oil control assembly is not twisted and remains stable within the piston ring groove during operation. Prior attempts to design an expander-spacer without the counter rotating coupling have not been successful.

SUMMARY OF THE INVENTION

In accordance with the present invention, a three-piece oil control ring including top and bottom split rail rings and a generally U-shaped in axial section circumferential spacer-expander is provided whereby unequal radial spring forces are exerted on the top and bottom rails while the required counter rotating coupling is maintained. The friction load of the oil ring on the engine is reduced without any adverse effect on oil control. Essentially, the three-piece oil control ring includes a circumferential spacer-expander having a plurality of generally U-shaped in axial section interconnected spring elements. Each spring element includes a top leg, a bottom leg and a base interconnecting the legs. The top leg defines a radial slot extending from the inner radial edge of the spacer-expander along the entire radial depth or width of the leg. The bottom leg is slotless and adjacent spring elements are interconnected by a web which defines a top rail stop. The centroid of each spring member is offset axially above the longitudinal center line of the spacer-expander so that a greater spring force is exerted on the top rail than on the bottom rail.

The unique three-piece circumferential spacer-expander oil control ring in accordance with the present invention significantly reduces the friction load of the oil control ring on the engine thereby increasing engine efficiency. The reduction of the load on the lower rail ring also reduces wear of the bore and corresponding wear of the lower rail ring. This reduction in the load on the lower rail permits a reduction in overall cost of the oil ring since chrome plating or coating of the lower rail with a wear reducing substance may be dispensed with. The spacer-expander is easily and readily manufactured employing conventional techniques. The ring may be formed by a punching operation where an interposed set of slots are punched in an elongated blank. The blank may then be shaped along a plurality of bend lines to define the spacer-expander.

DETAILED DESCRIPTION OF THE PREFERRED EMBODIMENT

Figures 1, 2, 3:
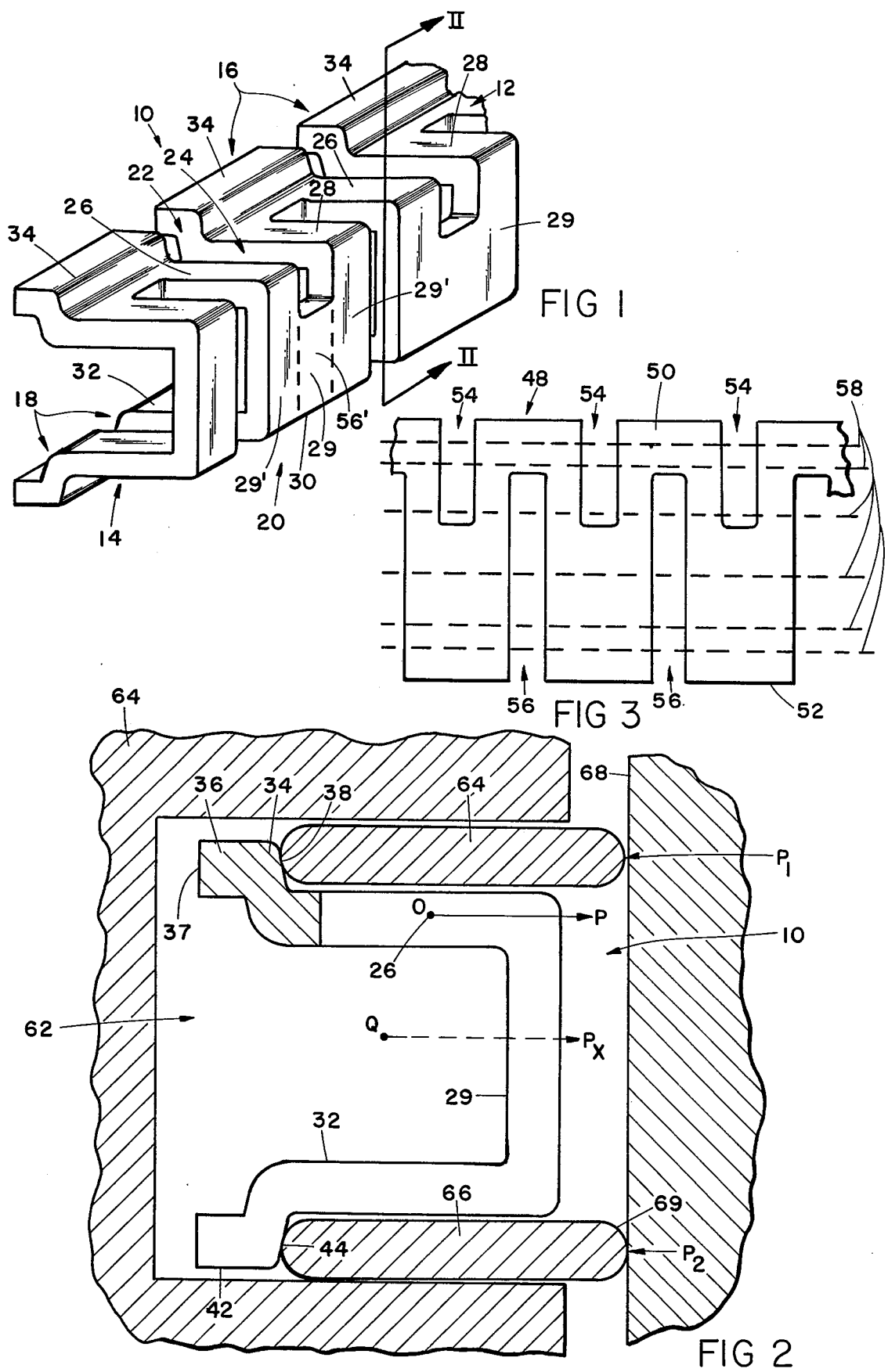
FIG. 1 is a fragmentary, perspective view of the circumferential spacer-expander in accordance with the present invention.
FIG. 2 is an enlarged, fragmentary, cross-sectional view of a piston having a three-piece oil control ring in accordance with the present invention disposed within a ring groove and bearing against the cylinder wall.
FIG. 3 is a fragmentary, plan view of a blank from which the circumferential spacer-expander of FIG. 1 is fabricated.

A circumferential spacer-expander for a three-piece oil control ring in accordance with the present invention is illustrated in FIG. 1 and generally designated 10. The spacer-expander 10 includes an upper rail seat 12, a lower rail seat 14, upper or top rail stops 16 and lower or bottom rail stops 18. The spacer-expander 10 is defined by a plurality of interconnected spring elements generally designated 20. Each spring element 20 includes a bifurcated top leg 22 having a radially extending slot 24 formed therein and thereby defining a pair of circumferentially spaced, transversely or radially extending upper struts 26, 28. Upper struts 26, 28 define rail seat 12. The top leg 22 is integral with a base 29. Integral with base 29 and extending radially inwardly from a bottom edge 30 thereof is a bottom leg 32. Bottom legs 32 define lower rail seat 14. Adjacent spring elements 22 are interconnected by integral web elements 34. Slots 24 open through the upper radial edge of the ring between adjacent webs 34.

Each web 34, as best seen in FIG. 2, is generally L-shaped in axial section and includes a first radially extending portion 36 having an inner edge 37 and a second, radially inwardly and upwardly extending portion 38. Webs 34 define the rail stops 16. Each web 34 extends circumferentially across the entire inner radial edge of adjacent struts 28, 26 of adjacent spring elements 20.

The base 29 of each of spring elements 20 defines a continuation of slot 24. This continuation of slot 24 terminates at a point spaced axially above the longitudinal center line of the spacer-expander.

The bottom leg 32 of each spring element 20 is slotless. The area of each bottom leg 32 adjacent the inner radial edge thereof is bent to define lower rail stop 18. As best seen in FIG. 2, each lower rail stop 18 is configured similar to the upper rail stops 16 and each is generally L-shaped in axial section. The lower rail stops therefore define a radially inwardly extending or horizontal portion 42 and a generally radially inwardly and upwardly extending portion 44. Base 29 is generally perpendicular to top leg 22 and bottom leg 32.

As seen in FIG. 3, spacer-expander 10 is fabricated from a blank generally designated 48. The blank 48 is an elongated, "thin" strip of material of the type which has heretofore been employed for fabricating generally U-shaped circumferential spacer-expanders. The blank 48 includes a first lateral edge 50 and a second lateral edge 52. Punched into the blank and opening through the first lateral edge 50 are a plurality of generally rectangular slots 54. Each of the slots 54 of the set of slots opening through lateral edge 50 terminates at a point between the first lateral edge and the longitudinal center line of the blank. Extending transversely of the blank 48 and interposed with the slots 54 are a plurality of generally rectangular slots 56. Slots 56 open through lateral edge 52 of the blank and terminate at a point between the first lateral edge 50 and the longitudinal center line of the blank. Each of the slots 54 of the set opening through the lateral edge 50 are equally spaced along the blank. Similarly, each of the slots 56 are equally spaced and the spacing between the slots 56 is equal to the spacing between the slots 54. The blank is bent along a plurality of bend lines 58 to form the horizontal portions 36, 42, the upper struts 26, 28 of the slotted top leg 22 of each spring element, the base 29, the bottom leg 32 and the bottom rail stop 18 including the portion 42.

Alternatively, the circumferential spacer-expander in accordance with the present invention may be described as including a plurality of generally U-shaped spring elements which are alternately interconnected by upper and lower webs or members. When viewed in this manner, each upper strut 26, 28 defines an upper strut of a single spring element. The base 29 may then be considered as being divided into portions 29' which are alternately interconnected by a centrally located continuity web 56'. The portions 29' and 56' have been delineated by dotted lines on one of the spring element 22 in FIG. 1. The lower or bottom leg 32 of the spring element 22 may then be considered as being divided into a pair of lower struts which are continuations of base portions 29' and which are interconnected by a continuation of continuity web 56'. Continuity web 56' and continuations of base portions 29' are integral and define the bottom rail stop 18. Top rail stops 16 alternately interconnect upper struts 26, 28 and continuity webs 56' which extend axially along the base portions and radially along the lower struts interconnect the remaining spring elements.

In use, the circumferential spacer-expander 10 is disposed within a groove 62 defined by a piston 64. The spacer-expander 10 axially spaces a top, split rail ring 64 from a bottom, split rail ring 66. The split rail rings are of conventional design. The spacer-expander in accordance with the present invention exerts a greater radial tension on the top rail 64 than on the bottom rail 66. Unit pressure designated $P_1$ (FIG. 2) exerted on cylinder bore 68 is therefore greater than unit pressure $P_2$ exerted on cylinder bore 68 by lower rail 66. With standard commercially available spacer-expanders for three-piece rings $P_1$ and $P_2$ are equal. The centroid of the spring member is at a point designated Q in FIG. 2. The spring members of such conventional spacer-expanders are central to $P_1$ and $P_2$ and exert a load $P_x$ acting through Q. Due to the configuration of the U-shaped spring members of the circumferential spacer-expander in accordance with the present invention, the spring elements exert a force P through a centroid O. As a result, $P_1$ is greater than $P_2$. The difference between the forces $P_1$ and $P_2$ or unit pressures is dependent upon the distance between the point O and the point Q. The spring member is in effect offset from the longitudinal center line of the spacer-expander 10.

In configuring the spacer-expander and the resulting three-piece oil control ring in accordance with the present invention, it is important that the unit pressure exerted by the top rail 64 on a cylinder bore 68 is not reduced from that heretofore considered generally acceptable. Reducing the unit pressure would have the result of reducing the efficiency and hence the oil economy achieved by the oil control ring. By maintaining the unit pressure $P_1$ constant or equivalent to that of a standard oil control ring and reducing the unit pressure $P_2$ exerted by the lower or bottom ring 66 on the bore wall 68, a significant decrease in the total friction load of the oil ring results without a sacrifice in oil economy.

The three-piece oil control ring in accordance with the present invention effectively controls the amount of oil passing through the combustion chamber and significantly reduces friction loads since the unit pressure exerted by the top and bottom rails is not equal. The drop in friction loads increase engine efficiency and reduces wear on the cylinder bore wall 68. Further, reduction in the unit pressure exerted by the lower ring 66 reduces the wear on the lower rail ring. This reduction of load permits a reduction in the overall cost of the three-piece oil control ring since chrome plating or other wear resistant coating may be dispensed with on the outer face 69 of the lower rail ring. The elements of the three-piece oil control ring in accordance with the present invention, therefore, coact in such a manner as to increase overall engine efficiency, reduce the cost of manufacture of the oil control ring, and reduce wear, yet, required oil economy is maintained.

The above description should be considered as that of the preferred embodiment. The true spirit and scope of the present invention may be determined by reference to the appended claims.

The embodiments of the invention in which an exclusive property or privilege is claimed are defined as follows.

1. A circumferential spacer-expander for an oil control ring, comprising:
    a plurality of interconnected spring elements; and
    means for interconnecting said spring elements and for defining a top rail stop; said spring elements each including a generally U-shaped member in axial section having a top leg, a bottom leg and a base interconnecting said top and bottom legs, said top leg having a radial slot formed therein extending from an inner radial edge along the entire radial length of said top leg, and said bottom leg being slotless whereby the centroid of each spring element is located axially above the circumferential center line of said spacer-expander.

2. A circumferential spacer-expander as defined by claim 1 wherein said means interconnecting said spring elements comprises a plurality of webs, each web interconnecting and being integral with a pair of adjacent spring elements, said radial slot opening radially inwardly through the inner radial edge of said spacer-expander and between adjacent webs.

3. A circumferential spacer-expander as defined by claim 2 wherein said bottom leg adjacent the radial inner edge of said spacer-expander defines a bottom rail stop, said bottom rail stop being generally L-shaped in axial section.

4. A circumferential spacer-expander as defined by claim 2 wherein said radial slot of each of said spring elements extends into said base and terminates above the circumferential center line of said spacer-expander, said top leg and base being bifurcated to define a pair of circumferentially spaced upper struts, said upper struts defining a top rail seat.

5. A circumferential spacer-expander as defined by claim 4 wherein said webs interconnect adjacent upper struts of adjacent spring elements, said webs being generally L-shaped in axial section and extending the entire inner radial edge of said upper struts of adjacent spring elements.

6. A circumferential spacer-expander as defined by claim 5 wherein said base extends axially and generally perpendicular to both said top leg and said bottom leg.

7. A circumferential spacer-expander for use with top and bottom rail rings to thereby define a three-piece oil control ring, said spacer-expander comprising:

a plurality of U-shaped in axial section spring elements, each spring element including a top strut, a base, and a bottom strut;
a plurality of top rail stops, each stop interconnecting alternate adjacent spring elements and extending between adjacent top struts at the radial inner edges of said top struts; and
continuity webs interconnecting the remaining ones of said spring elements, each of said continuity webs extending axially along the base of adjacent spring elements from a point above the circumferential center line of said spacer-expander and radially inwardly along the entire radial length of the bottom struts of adjacent spring elements.

8. A circumferential spacer-expander as defined by claim 7 wherein said rail stops are each generally L-shaped in axial cross section.

9. A circumferential spacer-expander as defined by claim 8 wherein each of said continuity webs and each of the bottom struts define a bottom rail stop.

10. A circumferential spacer-expander as defined by claim 9 wherein each of said bottom rail stops are generally L-shaped in axial cross section.

11. A three-piece oil control ring comprising:
a top rail ring;
a bottom rail ring; and
a circumferential spacer-expander defining a top rail seat and rail stop in engagement with said top rail ring and a bottom rail seat and rail stop in engagement with said bottom rail ring, said spacer-expander exerting a greater tension on the top rail ring than on the bottom rail ring, said spacer-expander comprising:
a plurality of interconnected generally U-shaped spring elements, each element including a pair of circumferential spaced upper struts which define said upper rail seat, a base integral with the radial outer edges of said upper struts and a bottom leg integral with said base and extending radially inwardly from said base, said base having a slot extending from the top axial edge of said base to a point axially spaced above the circumferential center line of said spacer-expander, said slot opening between said upper struts.

12. A three-piece oil control ring as defined by claim 11 wherein adjacent upper struts of adjacent spring elements are interconnected along their inner radial edges by webs, each of said webs defining said top rail stops.

13. A three-piece oil control ring as defined by claim 12 wherein said bottom leg of each of said elements defines said bottom rail stop, said bottom leg along the radial inner edge thereof being generally L-shaped in axial section to define said bottom rail stop.

14. A three-piece oil control ring as defined by claim 13 wherein each of said webs is generally L-shaped in axial section to thereby define said top rail stop.

15. A blank bendable along a plurality of parallel bend lines to form a circumferential spacer-expander for use in an oil control ring wherein the tension on a top rail ring is greater than on a bottom rail ring, said blank comprising:
an elongated flat member, having a first lateral edge, a second lateral edge and a longitudinal center line, said flat member defining a first set of generally rectangular slots opening through said first lateral edge, each of said slots of said first set extending transversely of said member and terminating between said first lateral edge and said longitudinal center line, said flat member further defining a second set of slots interposed with the slots of said first set and opening through said second lateral edge, each of said slots of said second set extending transversely of said member and terminating between said longitudinal center line and said first lateral edge.

16. A blank as defined by claim 15 wherein said slots of said first set are equally spaced longitudinally of said member.

17. A blank as defined by claim 16 wherein said slots of said second set are equally spaced longitudinally of said member.

18. A blank as defined by claim 17 wherein each of said slots of said first set has the same dimensions.

19. A blank as defined by claim 18 wherein each of said slots of said second set has the same dimensions.

20. A blank as defined by claim 19 wherein the longitudinal spacing between said slots of said first set is generally equal to the longitudinal spacing between slots of said second set.

* * * * *